United States Patent [19]

Bergdahl

[11] 4,412,477
[45] Nov. 1, 1983

[54] ARRANGEMENT TO COUNTERACT OR PREVENT SPREADING OF FIRE OR SMOKE

[76] Inventor: Knut Bergdahl, Kvartsgrand 4, S-852 52 Sundsvall, Sweden

[21] Appl. No.: 282,026

[22] Filed: Jul. 10, 1981

Related U.S. Application Data

[63] Continuation of Ser. No. 35,824, May 4, 1979, Pat. No. 4,294,165.

[30] Foreign Application Priority Data

May 8, 1978 [SE] Sweden ............................ 7805197

[51] Int. Cl.³ .............................................. F16K 9/00
[52] U.S. Cl. ........................................ 98/1; 137/253; 52/168
[58] Field of Search ...................... 98/1; 236/49; 49/2; 137/253, 456; 52/168

[56] References Cited

U.S. PATENT DOCUMENTS 1,609,525  12/1926  Moldenhauer ...................... 137/253
3,756,137   2/1972  Scharres ................................ 98/1
4,075,798   2/1978  Tazaki ................................. 52/168

Primary Examiner—Albert J. Makay
Assistant Examiner—Henry Bennett
Attorney, Agent, or Firm—Diller, Ramik & Wight

[57] ABSTRACT

An arrangement to counteract or prevent spreading of fire, smoke or undesired gases through at least one passage, such as a ventilating duct, in a building. Said arrangement comprises a device adapted to keep the passage open normally but to close the passage when there is a risk of said spreading to occur. Said passage comprises at least one portion running in a drain trap-like path and said device comprises at least one supply means to supply, when there is a risk of said spreading to occur, a fluid to said drain trap-like portion in order to completely or partly fill the same while providing said closure of the passage.

4 Claims, 7 Drawing Figures

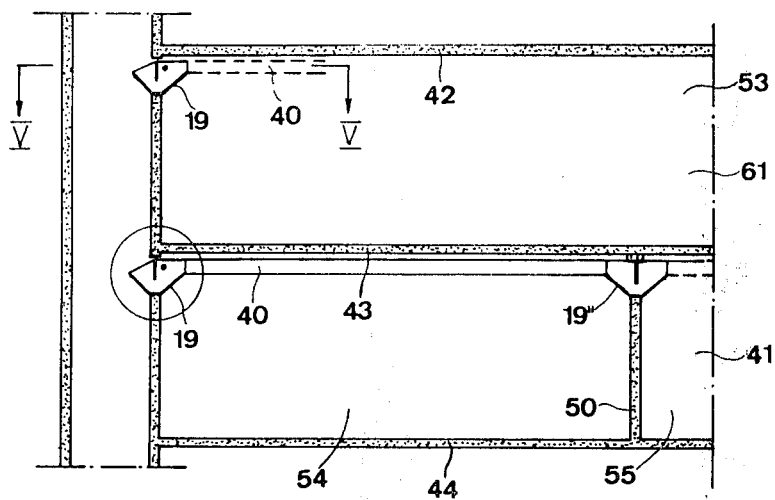
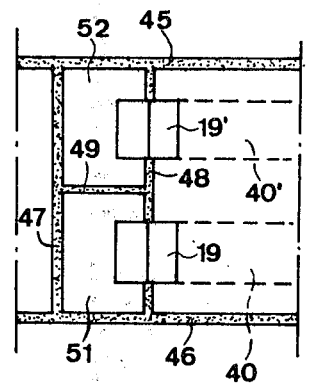
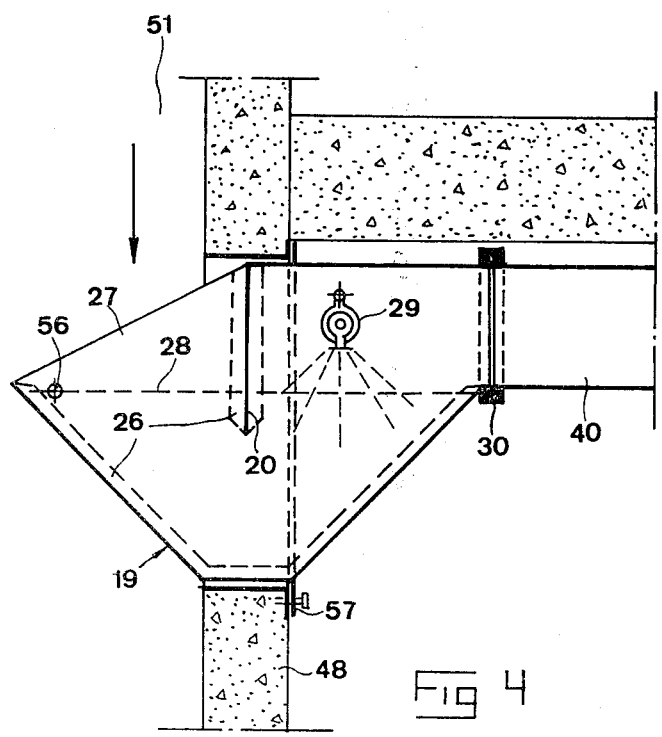

ARRANGEMENT TO COUNTERACT OR PREVENT SPREADING OF FIRE OR SMOKE

This application is a continuation of Ser. No. 35,824, filed May 4, 1979, now U.S. Pat. No. 4,294,165.

This invention is related to an arrangement to counteract or prevent spreading of fire, smoke or undesired gases through at least one passage in a building, said arrangement comprising a device adapted to keep the passage open normally but to close the passage when there is a risk of said spreading to occur.

Buildings are normally divided into so called fire-cells in order to prevent spreading of a fire. Said division is provided in that partitions between the fire-cells have a certain fire resistance.

Communicating passages between said fire-cells are, however, required. Illustrative examples of such passages are door openings and ventilation ducts. Ventilation ducts are of particular concern since they must be kept open normally. In order to obtain fire proof separation when the building is set on fire, mechanical fire dampers or bags inflatable by means of complicated equipment have been used. Apart from the fact that such mechanical and complicated devices are expensive, they require frequent checking and testing to ascertain their operability. It is also known to use material swelling under influence of heat to close different passages. However, it is a disadvantage that an excessive temperature must be reached before complete swelling occurs and accordingly, toxic fumes, particularly from plastics material, may be passed through in a fatal degree during considerable periods.

The object of this invention is to eliminate, as far as possible, mechanical functions and to provide a simple and efficient arrangement to counteract or prevent spreading of fire, smoke or undesired gases. This object is achieved in that said passage comprises at least one portion running in a drain trap-like path and in that said device comprises at least one supply means to supply, when there is a risk of said spreading to occur, a fluid to said drain trap-like portion in order to completely or partly fill the same while providing said closure of the passage.

With reference to the appended drawings a more specific description of embodiment examples of the invention will follow hereinafter.

In the drawings:

FIG. 3 is a schematic vertical section through a building;

FIG. 4 is an enlarged view of the encircled detail in FIG. 3;

FIG. 5 is a section along the line V—V in FIG. 3;

Figure 1:
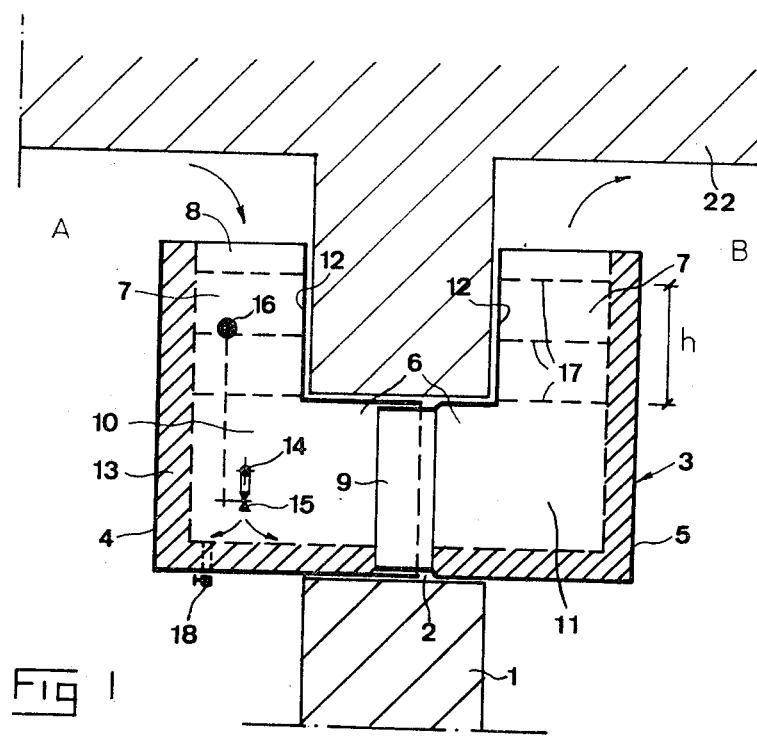
FIG. 1 is a section through a ventilation duct member between two fire cells.

In FIG. 1 two fire-cells are denoted A and B. The fire-cells are separated by a fire wall 1. A roof in the building is denoted 22. A ventilation passage through wall 1 is constituted by a ventilation duct 3 protruding through an aperture 2 in the wall. The ventilation duct 3 has the character of a rather short portion communicating between fire-cells A and B to transmit ventilating air from A to B (see the upper arrows). The duct portion 3 is designed so that the flow path of ventilating air through the duct runs in a drain trap-like loop which during normal operation of the ventilation system is open for flow of air. The duct portion 3 is, however, adapted to be filled with a fluid, particularly water, when there is a risk of spreading of fire or smoke through the duct portion so that said duct portion will act similar to a drain trap. i.e. as a gas barrier. Duct portion 3 forms a so called over flow device.

The duct portion 3 has the character of a container, which may comprise two cross-sectionally angular parts 4, 5, each of which comprises a circular tubular portion 6 and a box shaped portion 7 connected thereto. Said portions 7 have an upper opening 8. The parts 4, 5 are introduced with their circular tubular portions 6 into the circular aperture 2 from opposite sides of the wall 1 while forming the U-shaped configuration illustrated in FIG. 1 with the branches, i.e. portions 7, of said U facing upwardly.

It is to be understood that the box shaped duct portions 7 normally have a greater width in a direction perpendicular to the plane of the drawing than the circular portions 6. The tubular portion 6 of container part 5 comprises an end 9 having a reduced diameter and said end is adapted to be pushed into tubular portion 6 of container part 4. The container 3 is divided into two regions 10, 11 by the walls 12 of the container portions 7 and the upper part of the circular walls of the tubular portions 6. Thus, the walls 12 and the upper parts of the tubular portions 6 form together an element protruding down into the container 3 formed by parts 4, 5. Between said elements and the bottom of the container there is an opening. The container parts 4, 5 can be provided with a sound dampening and heat insulating coating 13.

The orifice of a supply conduit extending into the container 3 is denoted 14. Said conduit is connected to the water main of the building. At a suitable location up-stream orifice 14, there is provided a magnet valve or the like (not illustrated) which is controlled by at least one smoke and/or temperature responsive detector. A valve 15 is associated to the orifice 14 and operated by means of a float 16. The preadjustment of the float relative to valve 15 determines the fluid level in the container 3. Different fluid levels in container 3 are indicated with dotted lines 17. The letter h designates the height of the water column in container portions 7 above the upper part of the tubular portion 6 and said height can be selected with regard to the desired statical pressure resistance during a fire. A valve 18 may be provided in the bottom of the container 3 to enable drainage of the container after a fire. It is also conceivable to drain the container 3 automatically through the supply conduit comprising orifice 14.

The arrangement in FIG. 1 operates as follows: If a fire would occur in any of cells A or B, said smoke and/or temperature responsive detector will open the magnet valve described so that water will flow into container 3 through orifice 14. The water will separate the fire cells from each other in the same way as in a drain trap in that the filling of container 3 will proceed at least until the water level reaches the upper parts of the tubular portions 6. This is controlled by float 16 and valve 15. If the temperature rises excessively the water in the container will boil and vaporize and water will be continuously refilled into the container. The evaporation of the water will cool the container and improve the fire resistance. The drain trap-like function of container 3 will accordingly form an efficient barrier to the spreading of fire, smoke or undesired gases through opening 2 from one fire cell to the other.

Figure 2:
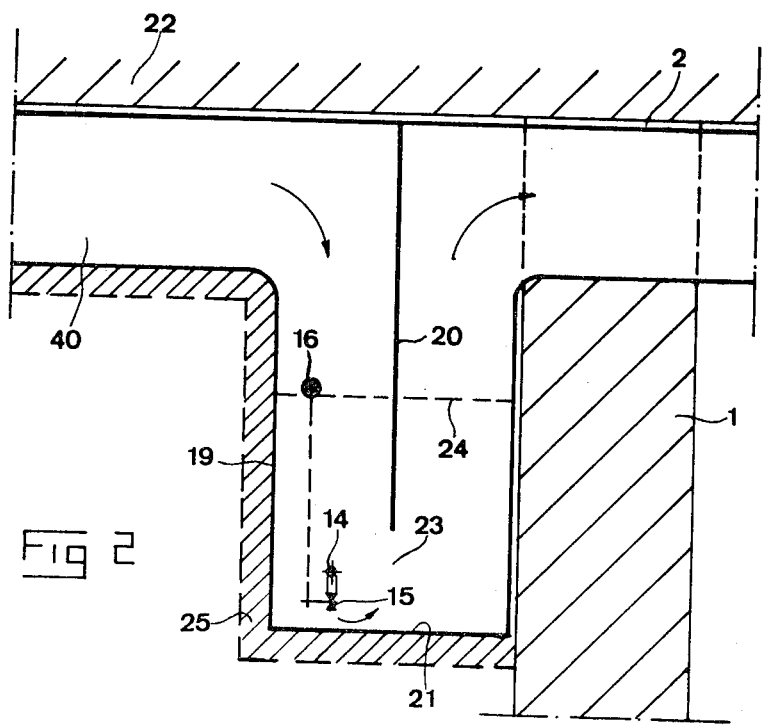
FIG. 2 is a longitudinal section through a ventilation duct.

In FIG. 2, there is illustrated a ventilating duct 40, a fire wall 1 and a roof 22. The ventilation duct 40 extends through a aperture 2 in wall 1. As in the previous embodiment, the ventilation duct 18 comprises a portion 19 which is designed so that the flow of ventilation air runs in a drain trap-like path. The duct portion 19 is also in this case designed as a container having a partition 20 projecting down into duct portion 19 from the upper face of duct 40. A opening 23 is present between the end of the partition and the bottom 21 of the container. As previously, a float 16, a supply conduit orifice 14 and a valve 15 are present. When spreading of fire or smoke through duct 40 is to be prevented, the container or portion 19 is filled with water to e.g. the level indicated by 24. Since the portion 19 is not aligned with the wall 1 an external fire insulation 25 is required. Said external insulation is not required in the embodiment according to FIG. 1.

In FIG. 3, there is illustrated a part of a building comprising floors 61 and 41. Horizontal joists 42–44 are indicated as well as vertical walls 45–50 (see also FIG. 5). Said walls divide a building into fire cells 51–55. The fire cells 51 and 52 constitute ventilation shafts preferably extending along the full height of the building. The shaft 51 may be used to supply fresh air to the building while shaft 52 is used to withdraw spent air therefrom. Suitable fans (not illustrated) are provided. Ventilation ducts 40, 40' extend horizontally in the building and have a portion 19 and 19' respectively penetrating through the wall 48 and communicating with shafts 51 and 52. One set of ducts 40 and 40' is provided on each floor 61, 41 and as seen in FIG. 3, the duct 40 (as well as the duct 40' lying therebehind) on floor 41 has a portion 19" penetrating through the wall 50.

In FIG. 4, the encircled portion 19 of duct 40 is illustrated in an enlarged scale. Said portion 19 has the character of a container and is designed to form a drain trap-like duct portion. A sound and heat insulating coating 26 is provided within the container 19. In this embodiment, a sprinkler nozzle 29 is provided to spray water downwardly towards the bottom of the container 19. In this way, a scrubber action on smoke passing through duct 40 will be obtained before the container 19 has been filled. When the container 19 has been filled, water will flow away into the ventilation shaft 51 through an overflow opening 56, which determines the fluid level 28 in the container 19. A partition 20 forming a drain trap tongue is provided and projects downwardly below the intended fluid level 28. The container has at one end an opening 27 facing into the shaft 51 and at the other end the container is connected to the duct 40 by means of a connector. The container 19 is attached to the wall 48 through a fastening flange 57. The advantage with the embodiment according to FIG. 4 is that the water which is continuously sprayed into the container 19 during a fire is continuously evacuated through the opening 56 into the shaft 51 where the water does not cause any damage to the building or furniture. There will be a continuous exchange of water in the container 19 and the same will be efficiently cooled. The arrangement illustrated in FIGS. 3–5 will form an efficient barrier to fire and smoke when the drain trap-like portions of the ducts have been filled with water. It is to be pointed out that the duct or container portion 19" in the wall 50 can be drained from overflowing water during a fire by the duct 40, i.e. water will flow from portion 19" to the portion 19 near the ventilation shaft 51. Alternatively, all or some of the drain trap-like portions can be provided with float controlled valves to maintain a proper fluid level during fire.

Figure 6:
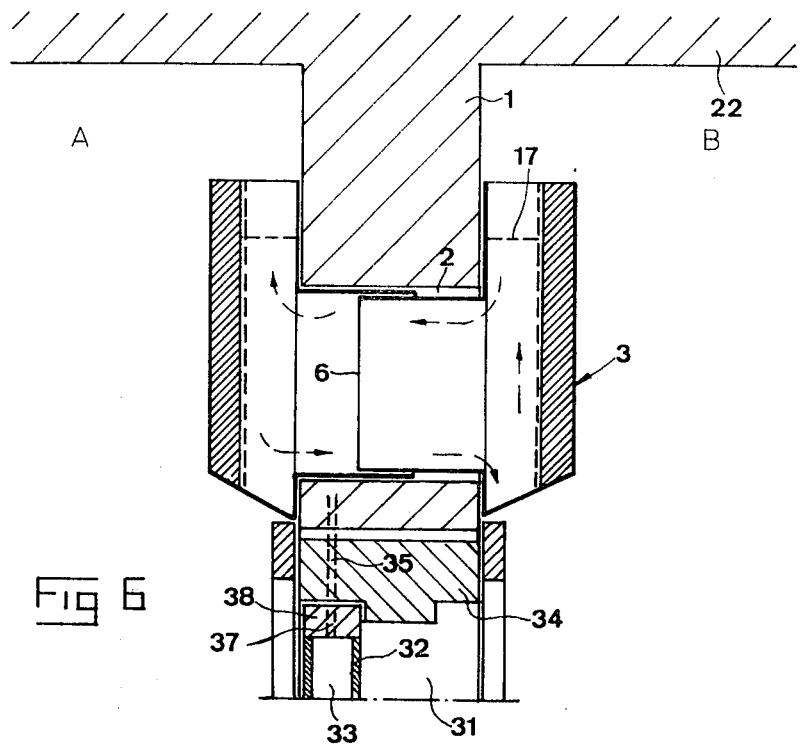
FIG. 6 is a schematic section through an alternative embodiment.
Figure 7:
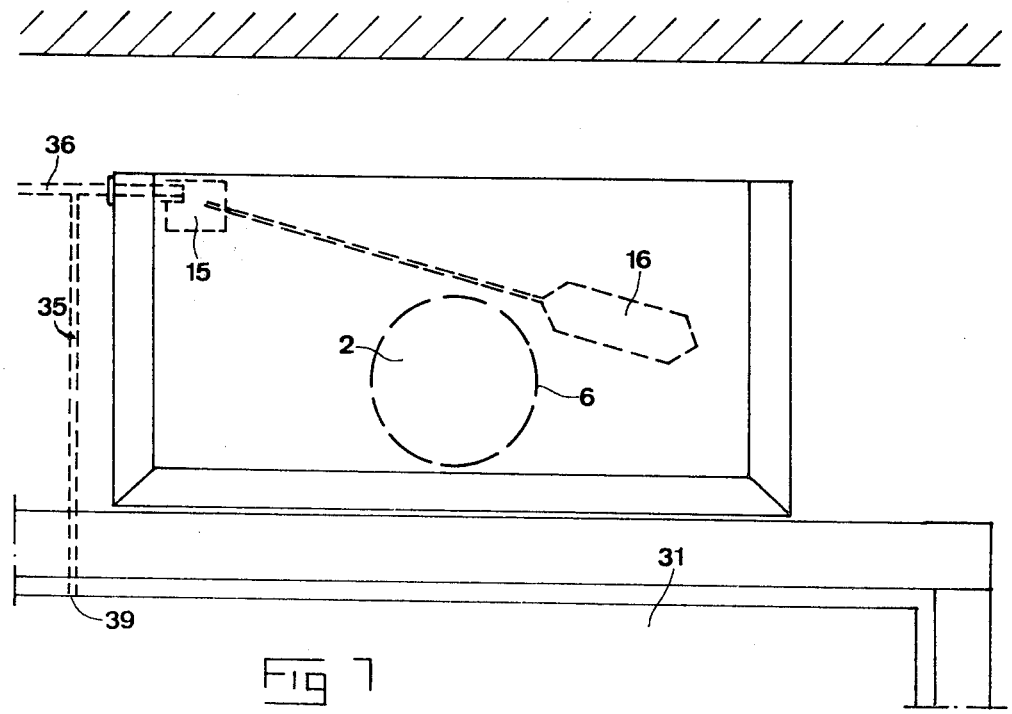
FIG. 7 is a view from the left of the embodiment in FIG. 6.

In FIGS. 6 and 7 an alternative embodiment is illustrated which as far as the container 3 is concerned corresponds to the embodiment in FIG. 1. As seen in FIG. 7, a water supply conduit 36 is provided with a valve 15 controlled by a float 16. In FIGS. 6 and 7 there is also illustrated an arrangement to counteract or prevent spreading of fire or smoke through a passage in the form of a door aperture 31. A door 32 hinged in the usual manner is located in the aperture 31 and said door has an interior cavity 33. A supply line 35 is provided in a door case 34 and adapted to supply a fluid of water to the cavity of the door. Said line 35 can be constituted by a branch of the conduit 36 intended to supply water to the container 3. The supply line 35 communicates with a filling hole 37 in the door and said opening is provided in an upper frame portion 38 of the door. When the door is closed (FIG. 6) the orifice 39 of line 35 is aligned with filling opening 37 in the door. It is to be understood that the fire door 35 is provided with a door shutter to keep the door normally closed.

In order to switch on water supply through line 35 the same valve (not illustrated) provided up stream the connection of line 35 to conduit 36 can be used. Said valve is controlled by at least one smoke and/or temperature detector. In that case the supply to the container 3 and door cavity will take place in parallel. Separate supply conduits can of course be used to supply the container 3 and door 32 and said conduits can be controlled by separate detector regulated valves. It will normally be necessary to fill the container 3 before the door 32 since the fumes first occurring must be stopped as soon as possible and since the door 32, e.g. made of steel, wood or plastics, can prevent smoke passage if the door is closed. It will normally be necessary to fill the door 32 with water when a very high temperature or risk of ignition of the door appears. Thus, the filling of container 3 can be initiated by a smoke detector and/or a temperature detector while the filling of the door 32 can be initiated by a temperature detector possibly adapted to control a valve in branch line 35. When the building is set on fire, the door 32 will be filled and cooled with water and obtain an increased fire resistance. One or more outlet openings of suitable size can be provided in the lower part of the door 32 so as to maintain a flow of water through the door. It is to be understood that a flexible conduit can be used between the orifice 39 and the hole 37.

In FIG. 6 there is illustrated with the dashed arrows how the water in the container 3 is circulating if the fire cell B would be on fire. This circulation will equalize the temperature of the water in the container 3.

It should be noted that it is also possible to supply water to the arrangement according to the invention from a suitably located receptacle if no water main is at hand. Other fluids than water can also be used.

I claim:

1. An arrangement to counteract or prevent the spreading of fire or smoke comprising means for defining a partition between two chambers of a static structure, means for defining an aperture in said partition for normally placing said two chambers in fluid communication with each other, means for normally maintaining said aperture open while being operative to close said aperture in response to the detection of fire or smoke, said last-mentioned means including a drain trap-like conduit portion through which air can normally flow to pass through said aperture between said two chambers, means for detecting a predetermined level of smoke or temperature, means for responding to said detecting means for filling and closing said drain trap-like conduit portion with a non-combustible fluid thereby closing communication between said two chambers through said aperture, said drain trap-like conduit portion being located substantially entirely in one of said two chambers, said partition being a vertical wall common to said two chambers and said aperture being contiguous ceilings of said two chambers, said drain trap-like conduit portion being defined by a bight conduit portion and a pair of upwardly opening conduit leg portions all located in one of said chambers, and a conduit connecting one of said upwardly opening conduit leg portions to the other of said chambers through said aperture, and said one upwardly opening conduit leg portion being located adjacent said vertical wall.

2. An arrangement to counteract or prevent the spreading of fire or smoke comprising means for defining a partition between two chambers of a static structure, means for defining an aperture in said partition for normally placing said two chambers in fluid communication with each other, means for normally maintaining said aperture open while being operative to close said aperture in response to the detection of fire or smoke, said last-mentioned means including a drain trap-like conduit portion through which air can normally flow to pass through said aperture between said two chambers, means for detecting a predetermined level of smoke or temperature, means for responding to said detecting means for filling and closing said drain trap-like conduit portion with a non-combustible fluid thereby closing communication between said two chambers through said aperture, said drain trap-like conduit portion being defined by two generally L-shaped conduit portions each including a generally vertical conduit portion and a generally horizontal conduit portion, and said generally horizontal conduit portions being united through said aperture so as to define in unison a generally U-shaped configuration.

3. An arrangement to counteract or prevent the spreading of fire or smoke comprising means for defining a partition between two chambers of a static structure, means for defining an aperture in said partition for normally placing said two chambers in fluid communication with each other, means for normally maintaining said aperture open while being operative to close said aperture in response to the detection of fire or smoke, said last-mentioned means including a drain trap-like conduit portion through which air can normally flow to pass through said aperture between said two chambers, means for detecting a predetermined level of smoke or temperature, means for responding to said detecting means for filling and closing said drain trap-like conduit portion with a non-combustible fluid thereby closing communication between said two chambers through said aperture, said drain trap-like conduit portion being located at least in part within said aperture so as to be able to present within said aperture a barrier of non-combustible fluid when said portion has been filled, said drain trap-like conduit portion having a generally L-shaped configuration including a base part, said base part generally completely occupying the entirety of said aperture, and said means for responding to said detecting means for closing communication between said two chambers through said aperture being adapted to essentially completely fill the base part of said drain trap-like conduit portion with fluid.

4. The arrangement as defined in claim 3 including means for automatically maintaining the level of the non-combustible fluid in said drain trap-like conduit portion above an upper portion of said aperture.

* * * * *